United States Patent [19]

Gudeman

[11] 4,120,711
[45] Oct. 17, 1978

[54] PROCESS FOR SEALING END CAPS TO FILTER CARTRIDGES

[75] Inventor: William J. Gudeman, Elgin, Ill.

[73] Assignee: Universal Water Systems, Inc., West Chicago, Ill.

[21] Appl. No.: 838,140

[22] Filed: Sep. 30, 1977

[51] Int. Cl.$^2$ .................. B29C 27/00; B65C 11/04
[52] U.S. Cl. ............................. 156/69; 156/357; 156/578; 427/284; 118/238; 118/241
[58] Field of Search ............ 210/493 R; 156/69, 357, 156/356, 578; 427/284, 285, 207 A, 207 C; 118/238, 241

[56] References Cited

U.S. PATENT DOCUMENTS

| | | | |
|---|---|---|---|
| 2,976,200 | 3/1961 | Stover | 156/69 |
| 3,164,506 | 1/1965 | Lake | 156/69 |
| 3,170,826 | 2/1965 | Norton et al. | 156/69 |
| 3,354,012 | 11/1967 | Forman et al. | 156/69 |

*Primary Examiner*—Douglas J. Drummond

[57] ABSTRACT

A process for sealing molded end caps to filter tubes comprises providing a holder for an end cap and a means for automatically dispensing a predetermined quantity of a hot, molten adhesive into the end cap. After the adhesive is added to the end cap, a filter cartridge is inserted into the end cap under slight pressure to embed the ends of the filter in the adhesive. Subsequent cooling of the adhesive results in an effective seal.

10 Claims, 3 Drawing Figures

PROCESS FOR SEALING END CAPS TO FILTER CARTRIDGES

FIELD OF THE INVENTION

This invention relates generally to the art of filter cartridges and more particularly to a method for sealing end caps to the filter material. Still more particularly the invention relates to a process for applying a predetermined amount of adhesive between the filter cartridge and the end cap.

BACKGROUND OF THE INVENTION

Filter cartridges are used for a variety of jobs, e.g. the filtration of water, the filtration of air, the filtration of lubricants, etc. The filters with which the present invention is primarily concerned are those filters which are cylindrical in shape and which include a hollow cylindrical core the material surrounding the core can be radial pleats of filter material or other configurations of filter material. The filter material may be paper, plastic or metal. In some prior art filters, plastic webs are provided around the outside and around the core of the filter to add to the structural integrity of the assembly.

Such filter cartridges also typically include end caps for protecting and sealing the ends of the units. The end caps commonly include a flat annular surface adapted to abut the ends of the filter cartridge and a pair of annular collars. The first collar is centrally located and is adapted to fit within the core of the filter, while the second collar extends from the circumference of the flat surface to encircle the ends of the filter tube.

In the prior art, adhesives have been used to seal the end caps to the filter tube. Epoxies are frequently employed, but a wide variety of other sealants can be used as long as the adhesive is resistant to the fluid being filtered and to the temperatures encountered during use. Several problems have yet to be overcome in the use of such adhesives. The most troublesome problem to solve is the uniform application of adhesive. Because the filter medium is porous, it is essential that the ends be totally sealed to the end cap or else leaks will develop destroying the efficiency of the filter assembly. Another problem which has been encountered is the development of an efficient manufacturing process for properly sealing the end caps to the filter tube.

One prior art solution to the end cap sealing problem is suggested in Luchetta's U.S. Pat. No. 3,528,557 issued Sept. 15, 1974 for "Filter Construction." Luchetta relates the prior art problem of effective sealing to the uneven distribution of adhesives at the area between the ends of the pleats and the end cap. The solution suggested in Luchetta is to provide one or more annular ridges on the internal face of the end cap to separate the pleat ends slightly from the cap. The ridges are provided to reduce dry spots between the end caps and the pleats.

Another prior art patent showing the use of adhesives to seal a pleated paper element to a metal end cap is Mumby's U.S. Pat. No. 3,392,843 issued July 16, 1968 for "Pleated Filter Cartridge and Its Method of Manufacture." This patent merely discloses the use of a layer of liquid adhesive to seal the end caps to the paper. The adhesive is heated in an oven to affect the final seal.

The method for preparing filter cartridges which overcomes the above-noted disadvantages of the prior art would be a significant advance in this technology.

OBJECTS OF THE INVENTION

It is a primary object of the present invention to provide a process for sealing molded end caps to the ends of cylindrical filter tubes.

Another object of the present invention is to provide a process for end cap sealing which is fast, reliable and which results in a leakproof seal of the end cap to the tube.

It is yet another object of the present invention to provide a sealing process which can be automated using relatively uncomplicated equipment.

How these and other objects of the present invention are accomplished will be described in the following specification taken in conjunction with the FIGURES. Generally, however, the objects are accomplished by providing equipment which includes a slidably mounted holder for an end cap. The holder is moveable between first and second positions. In the first position, the holder is located for receiving hot, molten adhesive from a dispensing gun, while movement of the holder to its second position allows a filter cartridge to be inserted into the end cap to affect a seal between the filter tube and the end cap. The equipment can be automated so that movement of the holder from its second to its first position results in the automatic dispensing of adhesive to an end cap inserted in the holder. Various modifications of the equipment and materials which can be used are described in the following specification.

DESCRIPTION OF THE PREFERRED EMBODIMENT

Figure 1:
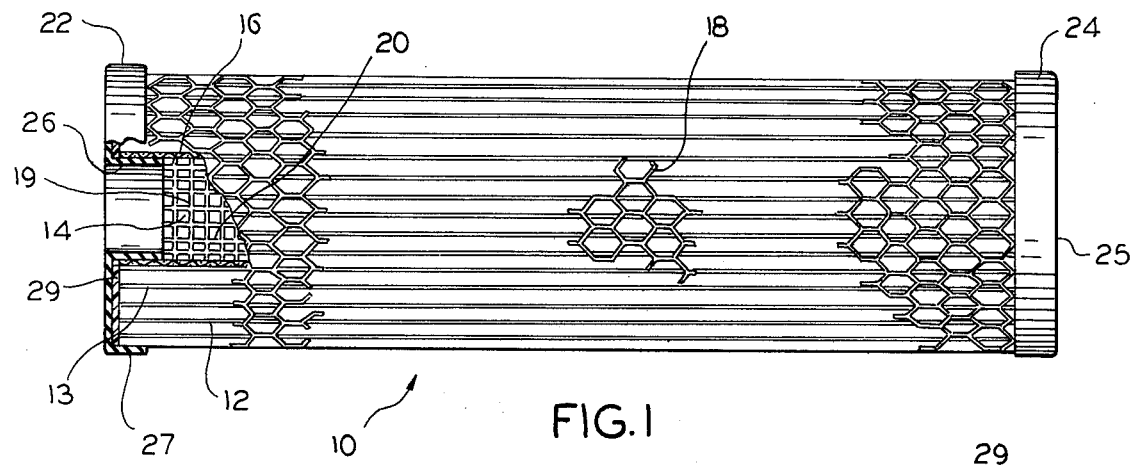
FIG. 1 is a side elevation view, with parts broken away, of a filter cartridge prepared according to the process of the present invention.

FIG. 1 shows one type of preferred filter cartridge 10 which may be prepared according to the process of the present invention. Cartridge 10 is a pleated water filtration cartridge, but it should be emphasized at the beginning of this description that the illustrated form of cartridge should not be taken as limiting. Other sizes and shapes of cartridges can be formed using the process of the present invention, and various materials can be employed for the filter media, filter media supports, end caps and adhesives soon to be described. For example, the filter tube could also be of the rolled log or extruded types. References to certain manufacturers for processing machinery and their model numbers incorporated in this specification should also be taken as illustrative, as substitutions for the various components could be made by one skilled in the art after reading the following description.

Cartridge 10 includes an elongate tubular paper filter element 12 formed of a plurality of radial pleats 13 which encircle an open core 14. The filter element 12 is selected, in this embodiment, for filtering water and accordingly the pore size of the material is selected to be permeable to water but impermeable to the common impurities found in water such as mineral particles, silt and the like.

Filter cartridge 10 also includes two cylindrical support sleeves 16 and 18. Sleeves 16 fit within element 12 and surround the core 14 of filter cartridge 10. In the illustrated embodiment, sleeve 12 is constructed of a plastic, screen-like material having a plurality of intersecting circular ring members 19 and longitudinal struts 20. Struts 20 lie along the surface of core 14.

Sleeve 18 in the illustrated form is a honey-comb mesh sleeve which is preferably constructed of flexible plastic strands. The particular structure for sleeves 16 and 18 can be selected by one skilled in the art after considering the fluid pressures and types of fluids to be filtered through cartridge 10.

Cartridge 10 also includes a pair of end caps 22 and 24 which are generally cup shaped and adapted for surrounding and enclosing the ends of filter media 12. End caps 22 and 24 each include a generally planer and circular end portion 25, a central annular collar 26 adapted to be inserted within core 14 and an annular collar or flange 27 at the circumference of portion 25. Flange 27 is adapted for slideably engaging the ends of filter media 12 and the ends of sleeve 18.

End caps 22 and 24 may be constructed from a number of different materials, but the preferred material is a pliable, molding-grade of polyvinyl chloride such as Polyvin No. 6707 which is available from A. Schulman, Inc. Metal end caps are suitable for some filtering applications and other pliable or rigid plastic materials can also be used.

The final component of filter cartridge 10 is a layer of adhesive 29 sealing filter media 12 to end caps 22 and 24. The illustration shows that the ends of the V-shaped pleats 13 are embedded in the adhesive layer 29 and are completely covered by adhesive 29 to prevent leaks from occurring during use of filter cartridge 10.

Many different adhesives may be used, but the preferred adhesive is a modified vinyl acetate adhesive known as Insta-weld 34–3120 sold by the National Adhesives Division of the National Starch and Chemical Corporation. This adhesive is an opaque, white solid at room temperature; it has a running temperature of 340–370F and a viscocity of 3875 cps at 350F. Additionally, the adhesive is waterproof and inert to the normal impurities found in water supplies.

The adhesive material may be a thermosetting adhesive, in which case a final heat curing step is necessary, or as in the preferred embodiment may be the type of adhesive which is applied in a hot, molten state and allowed to cool to harden and provide the desired seal. After reading this specification, one skilled in the adhesive art could readily select a suitable adhesive upon consideration of such factors as the polarity of the fluid to be filtered, filtering temperatures, compatibility of the end cap and filter media with the adhesive, etc.

Figure 2:
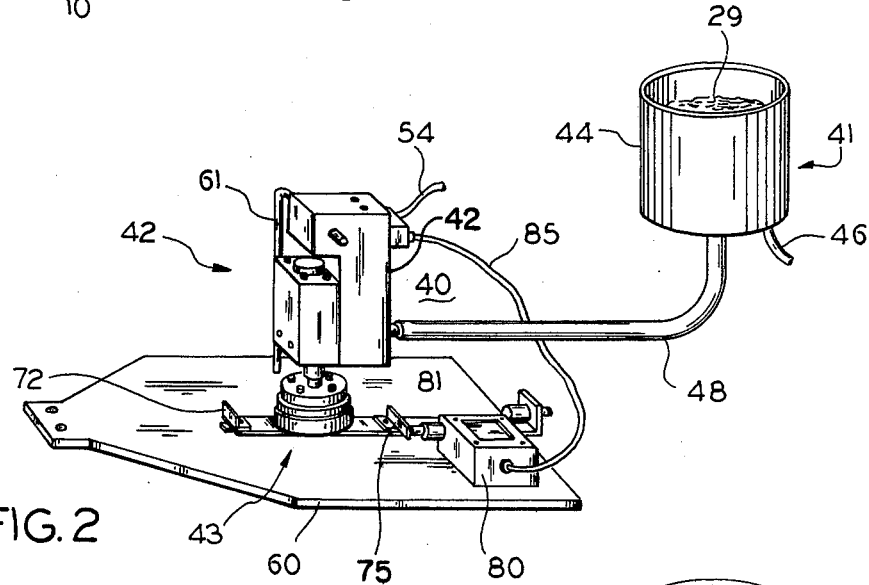
FIG. 2 is a side perspective view of the preferred equipment employed in the process of the present invention, the end cap holder being in a first adhesive loading position.

Reference is now made to FIG. 2 to describe the process of the present invention and the preferred equipment for carrying out the process. FIG. 2 shows an adhesive dispensing system 40 which includes three major components: a hot melt tank 41, an adhesive dispensing gun 42 and a slideably mounted end cap support system 43.

The hot melt tank 41 comprises a container 44 including heating means (not shown) for heating the adhesive 29 to its running temperature, i.e. about 350F for the Insta-weld adhesive referred to above. A power supply cord 46 is connected to a suitable source of electric current. The hot melt tank will not be described in detail because such tanks are known to the art and, in and of itself, the tank does not constitute an essential part of the present invention. One type of tank 41 which has been found particularly well suited for use in the process of the present invention is the Model No. 4 heating tank manufactred by Nordson Corporation.

A conduit 48 couples the hot melt tank 41 to the dispensing gun 42. The conduit preferably is thermally insulated to maintain the adhesive in a molten state and may include electric heating cables (not shown) to help in maintaining the desired temperature. The dispensing gun 42 will also not be described in detail because dispensing guns of this general type are known. One suitable, commerically available dispensing gun is the Model H-20-A Dispensing Gun manufactured by Nordson Corporation. It should suffice for purposes of the present description to say that gun 42 includes means for dispensing a preselected quantity of molten adhesive from the gun, an electrical supply 54 for an internal electric heater (not shown) for keeping the adhesive at or above its running temperature, and finally a circular nozzle 56 for dispensing the adhesive. The nozzle 56, in turn, includes one or more adhesive dispensing openings (not shown) on its lower surface.

In the embodiment shown in FIG. 2, the gun 42 is mounted on a stand 61 so that it is spaced apart from a horizontal platform 60 and is arranged so that nozzle 56 is directed downwardly toward platform 60. It should also be understood that the gun 42 and holding tank 41 are interconnected so that upon an appropriate signal (to be discussed below) a predetermined quantity of hot, molten adhesive is dispensed from nozzle 56 in a downward direction.

The platform 60 includes an elongate track 62 located beneath dispensing gun 42 beneath nozzle 56. The track 62 should preferably extend on both sides of gun 51 for at least several inches as will shortly become apparent.

Mounted to platform 60 at one end of track 62 is a stop-member 64 which in the illustrated embodiment comprises a resilient cylindrical member 65 mounted to a bracket 66. Slideably mounted to track 62 is an end cap carrier 68 which engages track 62 and slides back and forth under nozzle 56. In the illustrated embodiment the carrier is an elongate, rectangular plate member having a track engaging groove (not shown) on its lower surface. Mounted to the upper surface 69 of carrier 68 is a circular end cap receiving cup 70 selected in size to receive one of end caps 22 or 24. A handle 72 is also provided on carrier 68 at the end thereof remote from stop 64. The handle is employed for moving carrier 68 toward and away from the stop 64.

Intermediate the cup 70 and the end of carrier 68 adjacent stop 64 is a laterally extending arm member 75. This arm member extends generally perpendicularly to the carrier 68 and includes a contact surface 76 which travels in a plane perpendicularly to platform 60 as carrier 68 is moved back and forth along track 62.

Figure 3:
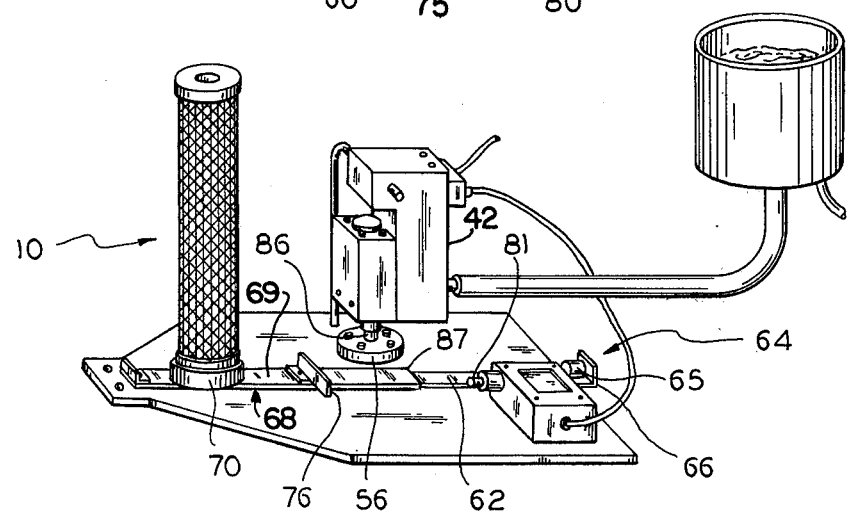
FIG. 3 is a side perspective view of the equipment shown in FIG. 2, except the end cap holder is in a second position and a filter cartridge is shown inserted into the end cap.

The final components of the equipment illustrated in FIGS. 2 and 3 include a contact switch 80 which is secured to platform 60 generally adjacent the resilient stop member 64, a switch contact pin 81 which is located in the plane of movement of surface 76 of the arm member 65 and an electrical connection (by wire 85) between the switch 80 and gun 42.

Now that the general components of the system have been described, their operation can be more fully understood. By positioning cup 70 containing one of the end caps below nozzle 56 a preselected quantity of molten adhesive can be added thereto. This is controlled in the present invention by having the parts arranged so that cup 70 is located below nozzle 56 when carrier 68 is at a first stop position (FIG. 2) with the end 87 of the carrier resting against stop cylinder 65. When in this position the surface of the contact arm member 75 is in contact with the pin 81 of contact switch 80. The resilient stop member 64 prevents damage to switch 80 which could be caused by arm 75 hitting pin 81 with excessive force. When the switch 80 is activated, a signal is sent to the dispensing gun through wire 85 so that a proper amount of the hot, molten adhesive is deposited into the end cap.

By grasping handle 72 of carrier 68 and pulling same away from the dispensing gun 42 and stop 64, the end cap containing the molten adhesive is brought to a second position (FIG. 3) where the filter cartridge can be inserted therein. The cartridge 10 is pressed downwardly in the end cap while the adhesive is still in a molten state to evenly spread the adhesive over the ends of pleats 13 to form a good seal between the cartridge and the end cap.

The procedure is repeated by removing the cartridge 10 and its attached end cap, inserting a new end cap in cup 70 and pushing handle 72 to urge the carrier 68 to its first position. This again activates the contact switch causing another quantity of adhesive to be dispensed.

Numerous variations of the present invention also fall within its scope. In addition to the various mechanical features discussed above, the nozzle 56 may be variously embodied. The number of dispensing holes may be changed and nozzle 56 can be constructed so that it rotates during adhesive addition to cause a more even layer of the adhesive to be deposited in the end cap.

Likewise, the nozzle 56 may be constructed to reciprocate on shaft 86 so that the distance from the dispensing openings to the receiving surface of the end caps can be reduced at the time of adhesive addition. Such a modification is especially valuable if tall end caps are used whose side walls would obstruct movement of cup 70 between the first and second positions. So while the present invention has been described in connection with a single preferred embodiment, it is not to be limited to that embodiment but is to be limited solely by the claims which follow.

I claim:

1. A method for adhesively sealing annular, cup-shaped end caps to a cylindrical cartridge of filter material comprising the steps of:
    providing an annular end cap receiving means, said end cap receiving means being generally cup-shaped in cross-section and being adapted for receiving an end cap, the inner surface of said receiving means being presented upwardly and said receiving means being slidably mounted on an elongate track for movement between first and second positions;
    providing means for dispensing a preselected quantity of a liquid adhesive into said receiving means when said receiving means is in said first position in response to a signal;
    providing means for generating said signal when said receiving means is moved to said first position;
    placing an end cap in said receiving means so that the inner surface thereof is presented upwardly, moving said receiving means to its first position and dispensing said quantity of molten adhesive therein while said receiver is stationary;
    moving said receiving means to its second position;
    inserting one end of said cylindrical cartridge into said adhesive containing end cap under sufficient pressure to spread said adhesive over the end thereof while said adhesive is still in a molten condition; and
    hardening said adhesive to seal end cap to said cartridge.

2. The invention set forth in claim 1 wherein said end cap is placed in said receiving means when said receiving means is in its second position.

3. The invention set forth in claim 1 wherein said dispensing means includes means for melting a normally solid adhesive and dispensing gun means for dispensing said quantity of adhesive in a molten state in response to said signal.

4. The invention set forth in claim 1 wherein said support also includes switch means mounted adjacent said track means, said switch being adpated for generating said signal to said dispensing means.

5. The invention set forth in claim 4 wherein said receiving means includes an arm means extending perpendicularly to said track means and wherein said switch means comprises a contact switch means, said contact switch means being located whereby said arm member contacts said switch means when said receiving means is in its first position.

6. The invention set forth in claim 5 wherein said dispensing means includes a nozzle means and wherein said nozzle means is above said receiving means when said receiving means is in said first position.

7. The invention set forth in claim 1 wherein said end caps comprise molded end caps.

8. The invention set forth in claim 1 wherein said adhesive comprises a vinyl acetate adhesive which is dispensed in a hot, molten condition and is hardened by allowing the same to cool.

9. The invention set forth in claim 1 wherein said mounting of said receiving means includes providing a carrier member engaging said track means, said receiving means being mounted on the upper surface of said carrier member for being slideably moved between said first and second positions.

10. A process for adhesively sealing annular, cup-shaped
    end caps to a cylindrical cartridge of filter material comprising the steps of:
    providing an elongate track means;
    providing a carrier member engaging said track means for movement between first and second positions;
    providing a dispensing gun means spaced apart from and mounted above said track means, said dispensing gun means including nozzle means for dispensing a preselected quantity of molten adhesive in a downward direction when said carrier means is in said first position;
    providing an end cap receiving cup means mounted to the upper surface of said carrier means, the inner surface of said cup means being presented toward said nozzle means and being located beneath said nozzle means when said carrier is in its first position;
    providing contact switch means adjacent said track means and means on said carrier member for engaging said contact switch means when said carrier is in said first position;

providing means interconnecting said switch means and said dispensing gun means for dispensing said preselected quantity of adhesive when said switch means is activated;

placing said carrier member in its second position and inserting an end cap therein, said end cap being generally cup shaped and placed with its inner surface presented in an upward direction;

moving said carrier member to said first position whereby a predetermined quantity of molten adhesive is dispensed into said end cap;

moving said carrier member to its second position and inserting one end of said cylindrical filter material therein while said adhesive remains in a molten condition; and removing said filter material and said end cap from said end cap receiving cup means after said adhesive has cooled and sealed said cartridge to said end cap.

* * * * *